(12) United States Patent
Heisman

(10) Patent No.: US 6,988,799 B2
(45) Date of Patent: Jan. 24, 2006

(54) EYEGLASS DISPLAY AND DEMONSTRATION SYSTEM

(76) Inventor: Elliott R. Heisman, 57 N. Main St., Mullica Hill, NJ (US) 08062

( * ) Notice: Subject to any disclaimer, the term of this patent is extended or adjusted under 35 U.S.C. 154(b) by 0 days.

(21) Appl. No.: 10/760,685

(22) Filed: Jan. 20, 2004

(65) Prior Publication Data

US 2005/0157248 A1   Jul. 21, 2005

(51) Int. Cl.
   *G02C 7/16* (2006.01)

(52) U.S. Cl. .......................... 351/46; 351/45

(58) Field of Classification Search ............. 351/45, 351/46, 47, 44, 41
   See application file for complete search history.

(56) References Cited

U.S. PATENT DOCUMENTS 3,628,854 A * 12/1971 Jampolsky .................. 351/175

* cited by examiner

*Primary Examiner*—Hung Xuan Dang
(74) *Attorney, Agent, or Firm*—Stuart M. Goldstein

(57) ABSTRACT

An eyeglass lens and display and demonstration system uses a plurality of display sheets, each with a mounting surface. The mounting surfaces have different lens outlines, representing a variety of different lens sizes and shapes. Individual lens patterns made from electrostatic vinyl plastic or similar material are correspondingly shaped to the outlines on the mounting surfaces and are removably secured to the surfaces. The lens patterns are of differing shapes and tints. The plurality of display sheets are stored in a notebook, display box or similar display medium. In use, a lens pattern is simply peeled off the mounting surface of a display sheet and applied directly to the surface of the lenses of the eyeglass frames being considered by the eyeglass purchaser. In this manner, the purchaser can visualize how the eyeglasses will actually look with any given lens shape and tint, before the actual lenses are fitted in the frames.

19 Claims, 5 Drawing Sheets

EYEGLASS DISPLAY AND DEMONSTRATION SYSTEM

BACKGROUND OF THE INVENTION

The efficient display of eyeglasses and particularly sunglasses or glasses with tinted lenses is critical in the process of demonstrating and then selecting glasses. Given the vast variety of frame styles and lens shapes and tints, the eyeglass patient or purchaser cannot visualize how he or she will look in glasses unless they actually have the ability to try the glasses on. When purchasing frames with clear lenses, the purchaser can try on the frame before the final lenses are placed and easily see the way the glasses will look. However, when initially selecting sunglasses or glasses with tinted lenses and the particular lens are not available, it is difficult to visualize how a certain frame may look when the desired lens shape or tint is in place. And, to date, there has been no practical and effective way to display and demonstrate, to the eyeglass purchaser, the vast variety of such lenses, with different shades and tints, in order to allow the purchaser to actually see how the glasses will look, before they are finally fitted.

SUMMARY OF THE INVENTION

It is thus an object of the present invention to overcome the disadvantages and limitations of prior eyeglass and lens display and demonstration systems.

It is the object of the present invention to provide an effective and practical way to display and demonstrate a wide variety of lens shapes and tints.

It is a further object of the present invention to provide an eyeglass lens display and demonstration system which is portable, but which can still be used to easily and effectively demonstrate a substantial number of exemplar lens types.

It is still another object of the present invention to provide an eyeglass display and demonstration system with a variety of lens patterns of various sizes and tints which can be applied directly to lenses of eyeglass frames.

It is a further object of the present invention to provide an eyeglass display and demonstration system which allows a variety of interchangeable lens patterns to be quickly placed on and removed from eyeglass lenses so that eyeglass purchasers can see how the glasses will look once the actual lenses are fitted.

It is another object of the present invention to provide an eyeglass lens display and demonstration system which uses a variety of easily removable and replaceable lens patterns.

It is a further object of the present invention to provide an eyeglass display and demonstration system which uses lens patterns which are secured to the display and to eyeglass lenses themselves by other than mechanical means.

These and other objects are accomplished by the present invention, an eyeglass lens and display and demonstration system which comprises a plurality of display sheets, each with a mounting surface. The mounting surfaces have different lens outlines, representing a variety of different lens sizes and shapes. Individual lens patterns made from electrostatic vinyl plastic or similar material are correspondingly shaped to the outlines on the mounting surfaces and are removably secured to the surfaces. The lens patterns are of differing shapes and tints. The plurality of display sheets are stored in a notebook, display box or similar display medium. In use, a lens pattern is simply peeled off the mounting surface of a display sheet and applied directly to the surface of the lenses of the eyeglass frames being considered by the eyeglass purchaser. In this manner, the purchaser can visualize how the eyeglasses will actually look with any given lens shape and tint, before the actual lenses are fitted in the frames.

Novel features which are considered as characteristic of the invention are set forth in particular in the attendant claims. The invention, itself, however, both as to its design, construction and use, together with the additional features and advantages thereof, are best understood upon review of the following detailed description with reference to the accompanying drawings.

DETAILED DESCRIPTION OF THE INVENTION

Figure 1:
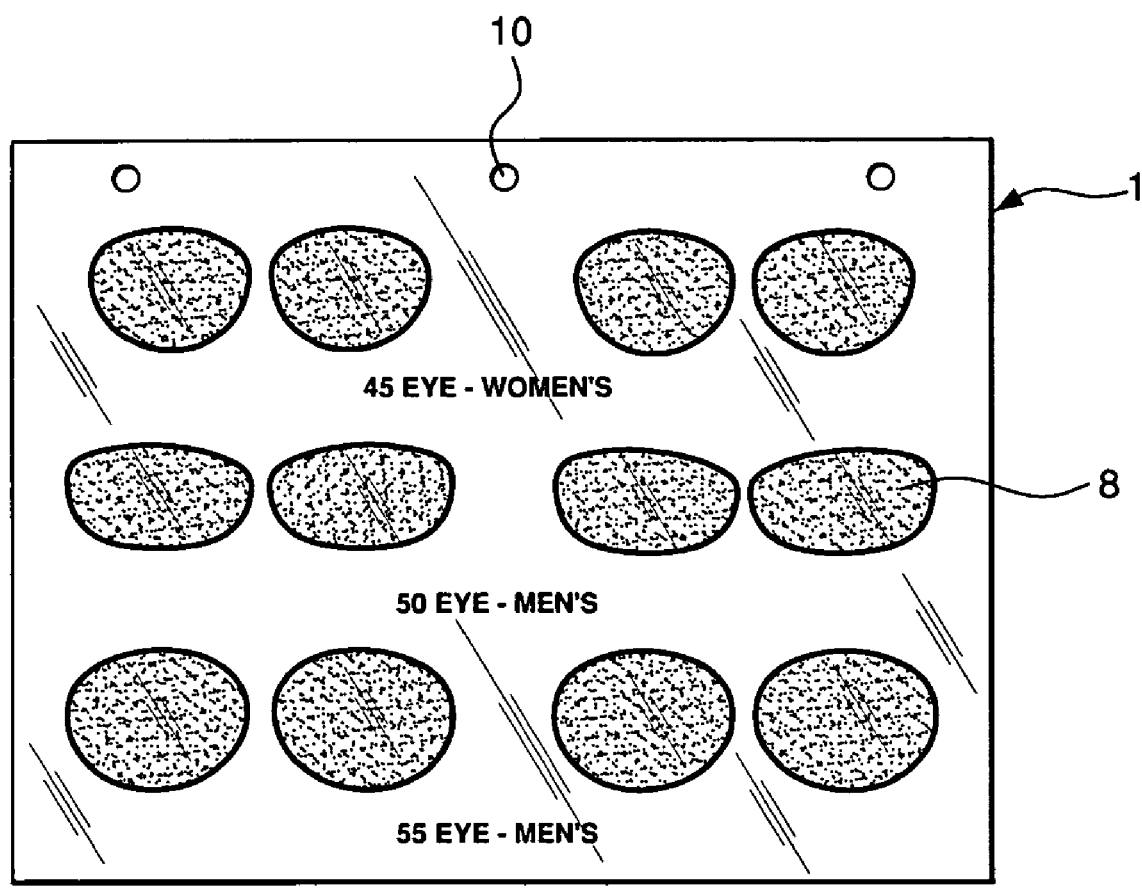
FIG. 1 shows a top view of a single display sheet of the present invention.
Figure 2:
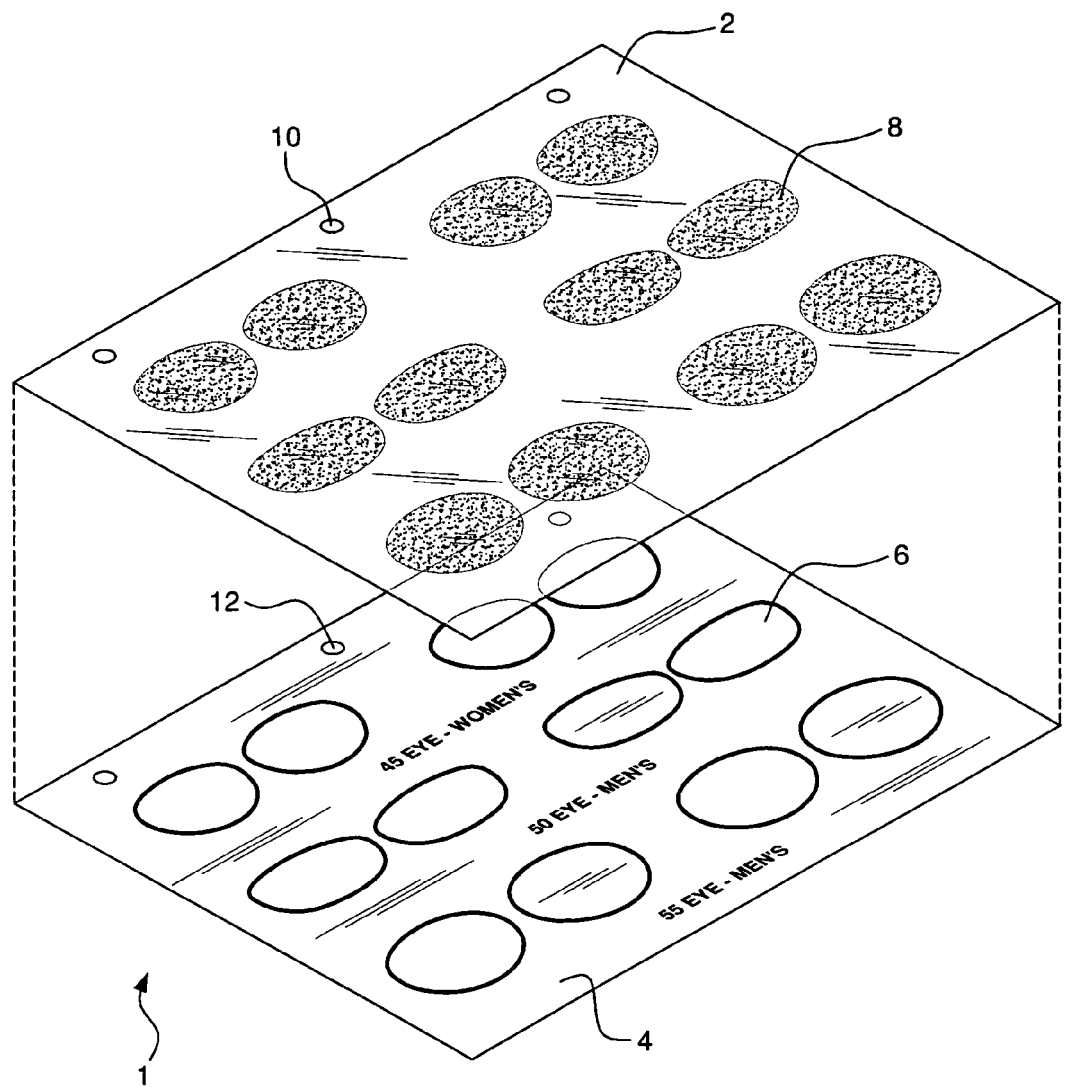
FIG. 2 shows various components of the display sheet.
Figure 3:
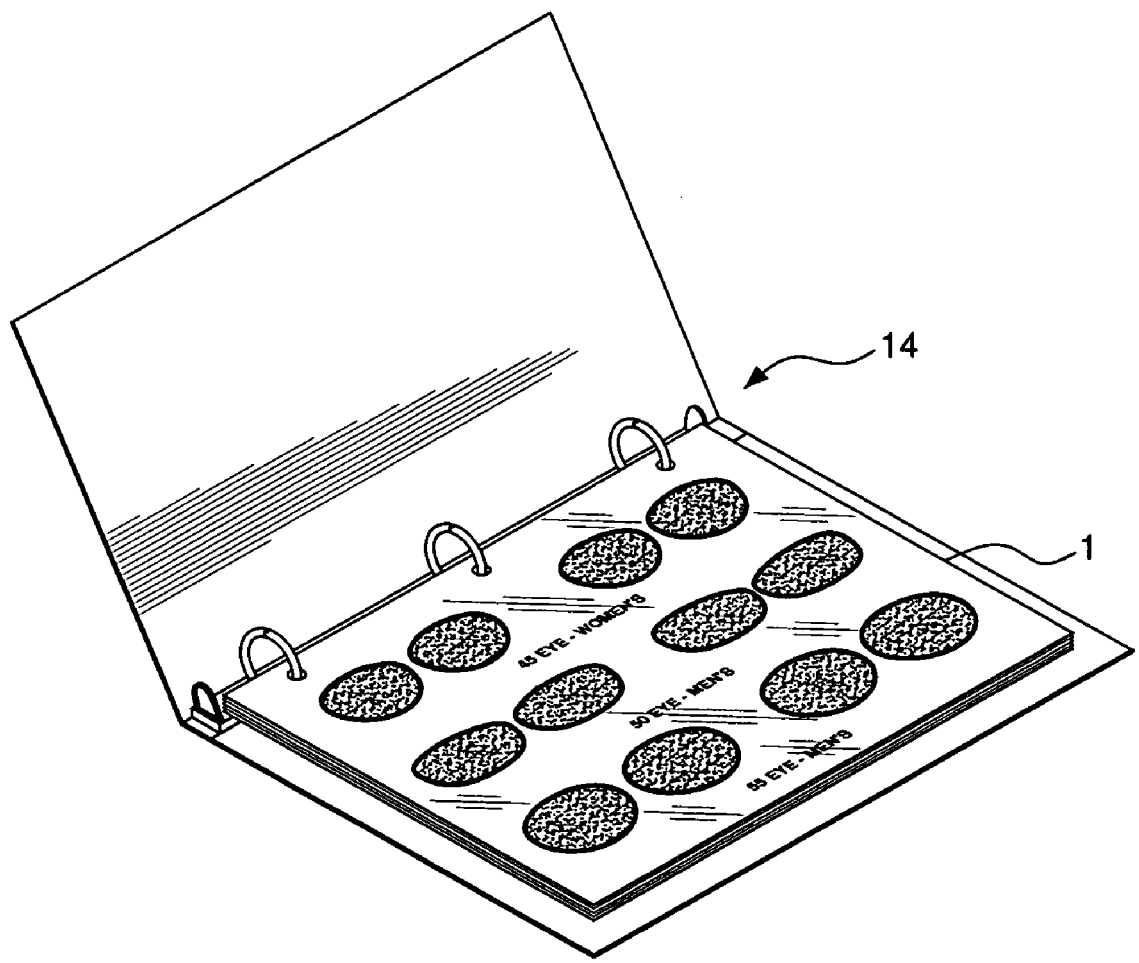
FIG. 3 shows display sheets mounted in a notebook.

The eyeglass lens display and demonstration system of the invention comprises display sheet 1 with electrostatic vinyl acetate, plastic or other high static material sheet 2 overlaying base sheet 4. Sheet 4 can be cardboard, rigid paper, or similar material. Sheet 4 comprises lens outlines 6, designed to represent a variety of different lens shapes. The top surface of sheet 2 is a mounting surface to which removable lens patterns 8, as best seen in FIG. 2, are removably attached. The shapes of lens patterns 8 correspond to outlines 6 on sheet 4. Lens patterns 8 are also made of electrostatic vinyl, acetate, plastic or like high static material, and, as a result, are removably attachable to sheet 2 only by electrostatic attraction, with the upper or lower surfaces of the lens patterns attached in flush relation with the sheet. Lens patterns 8 are tinted in a variety of different tints and colors. Punched holes 10 and 12 in sheets 2 and 4 respectively permit display sheet 1 to be used in notebook 14 such as seen in FIG. 3.

Figure 4:
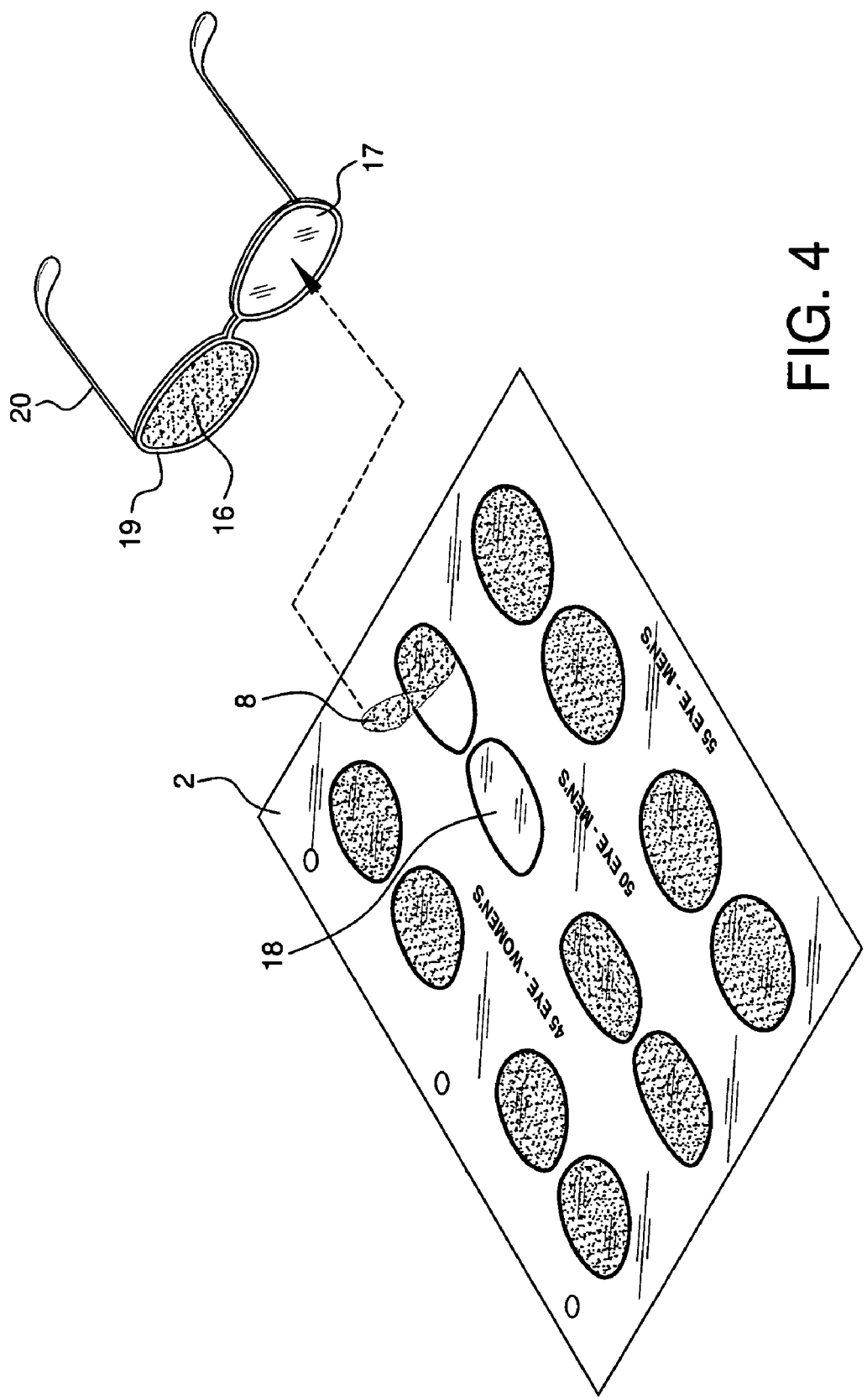
FIG. 4 shows the use of the display and demonstration system of the present invention.

In use, when it is necessary for a perspective eyeglass purchaser to visualize how he or she might look in a particular eyeglass frame 20, lens pattern 16 is peeled from sheet 2 overlying lens outline 18 and placed on one of the exemplar lenses 19 of eyeglass frame 20, as seen in FIG. 4. The electrostatic nature of lens pattern 16 allows the lens pattern to adhere to the glass or plastic lens 19. Similarly, also as seen in FIG. 4, lens pattern 8 is peeled off display sheet 2 and placed on the other exemplar lens 17 of eyeglass frame 20. In this manner, the eyeglass purchaser can easily visualize how he or she will look in a particular pair of glass frames with a variety of different colored or tinted lenses.

Figure 5:
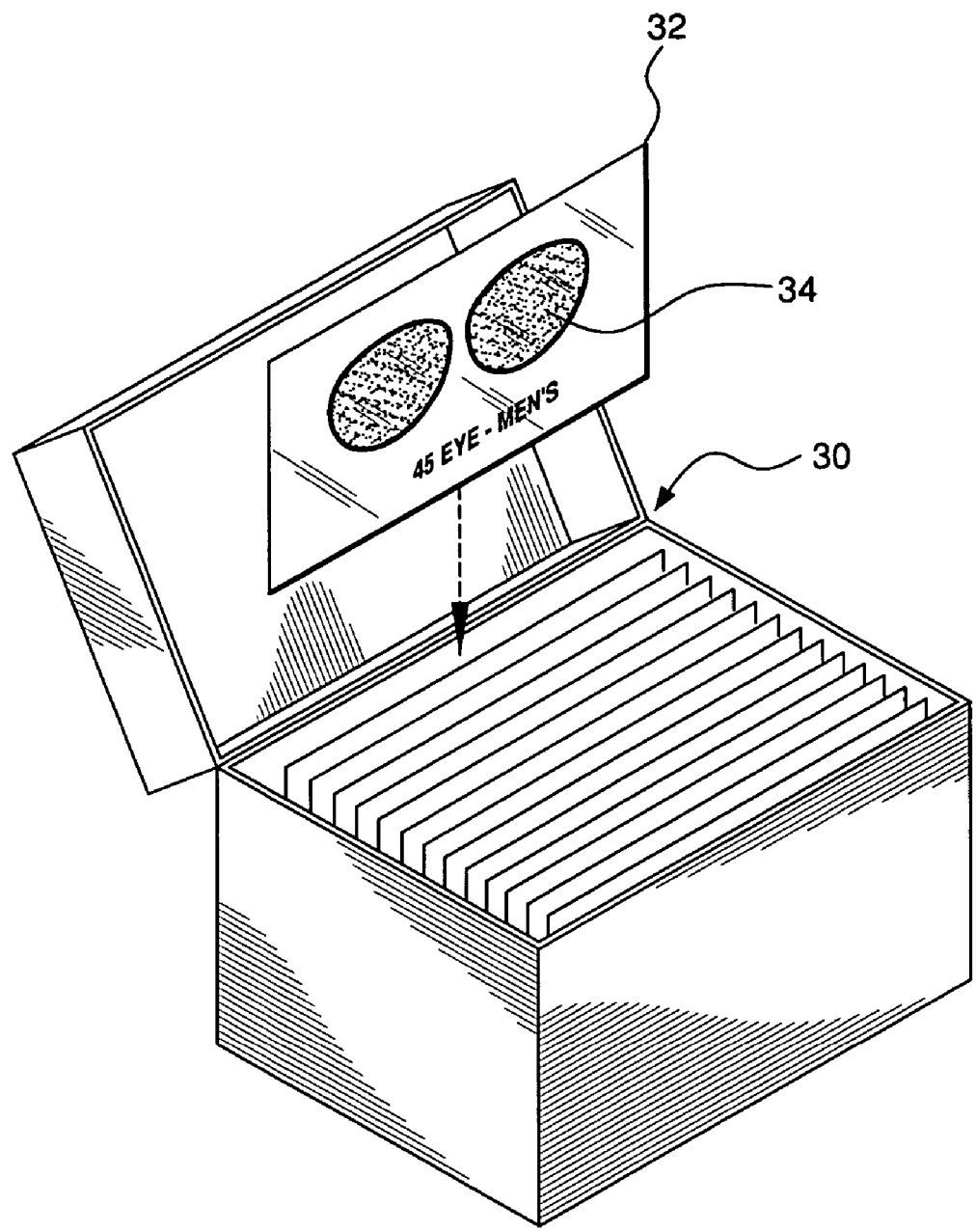
FIG. 5 shows display sheets stored in a display box.

FIG. 5 shows use of display sheet 32 with lens patterns 34 in display box 30. The use of the display sheets of the current invention is not restricted to notebooks or boxes but such sheets are also designed for use in other portable display mediums.

In addition, while display and demonstration system 1 is described herein with an upper display sheet 2 made of electrostatic, vinyl plastic, acetate, or similar high static material, overlaying a base sheet 4, it is within the purview of the invention to use a single sheet made of the electrostatic material in lieu of dual sheets. In such a case, lens pattern outlines would be placed directly on the electrostatic material sheet and the lens patterns would be placed thereon. However, the use of dual sheets, and particularly the use of the rigid paper or cardboard sheet contemplated for display sheet 4, provides substance and rigidity to the display system which will increase the durability and longevity of the product.

Certain novel features and components of this invention are disclosed in detail in order to make the invention clear in at least one form thereof. However, it is clearly to be understood that the invention as disclosed is not necessarily limited to the exact form and details as disclosed, since it is apparent that various modifications and changes may be made without departing from the spirit of the invention.

The invention claimed is:

1. An eyeglass lens display and demonstration system comprising a plurality of lens patterns of various shapes and sizes, each lens pattern comprising upper and lower surfaces, display means for mounting and exhibiting all of the plurality of lens patterns directly on the display means, each of said lens patterns being removably attached to the display means for ready removal from and reattachment to the display means, and means to mount and removably attach either of the upper or lower surfaces of the lens patterns to the display means by other than mechanical attachment, whereby said means reattaches each lens pattern to the display means.

2. The display and demonstration system of claim 1 wherein the display means comprises a plurality of lens pattern outlines corresponding to the shapes and sizes of the plurality of lens patterns.

3. The display and demonstration system of claim 1 wherein the lens patterns are of different tints and colors.

4. The display and demonstration system as in claim 1 wherein the lens patterns are removably attached in flush surface to surface relation to the display means.

5. The display and demonstration system of claim 1 wherein the means to mount and removably attach the plurality of lens patterns comprises electrostatic attraction between the display means and the lens patterns.

6. The display and demonstration system of claim 1 wherein the lens patterns and the display means are formed from electrostatic material.

7. The display and demonstration system of claim 1 wherein a lens pattern is removably peeled off the display means and returned to the display means by being pressed thereon.

8. The display and demonstration system of claim 1 wherein a lens pattern is removably peeled off the display means, attached to an eyeglass lens, removed from the eyeglass lens, and reattached to the display means by being pressed thereon.

9. An eyeglass lens display and demonstration system comprising a display sheet comprising a mounting surface, a plurality of lens patterns of various shapes and sizes each of said lens patterns being removably attached to the mounting surface for ready removal from and replacement on the display sheet, and means to mount and removably attach each of the lens patterns directly onto the mounting surface by other than mechanical attachment, whereby said means reattaches each of the lens patterns to the display sheet.

10. The display and demonstration system of claim 9 wherein the display sheet comprises a plurality of lens pattern outlines corresponding to the shapes and sizes of the plurality of lens patterns.

11. The display and demonstration system of claim 9 wherein the lens patterns are of different tints and colors.

12. The display and demonstration system as in claim 9 wherein the lens patterns are removably attached in flush surface to surface relation to the display sheet.

13. The display and demonstration system of claim 9 wherein the means to mount and removably attach the plurality of lens patterns comprises electrostatic attraction between the display sheet and the lens patterns.

14. The display and demonstration system of claim 9 wherein the lens patterns and the display sheet are formed from electrostatic material.

15. The display and demonstration system of claim 9 wherein a lens pattern is removably peeled off the display sheet and returned to the display sheet by being pressed thereon.

16. An eyeglass display and demonstration system comprising a plurality of lens patterns of various shapes and sizes, display means for mounting and exhibiting all of the plurality of lens patterns directly on the display means, each of the lens patterns being removably attached to the display means for ready removal from the display means and for attachment to eyeglass lenses and for removal from the eyeglass lenses and reattachment to the display means, and means to mount and removably attach each of the plurality of lens patterns to the display means and to the eyeglass lenses by other than mechanical attachment, whereby said means provides for repeated removal of the lens patterns from the display means and attachment to the eyeglass lenses and removal of the lens patterns from the eyeglass lenses for reattachment of each lens pattern to the display means.

17. The display and demonstration system of claim 16 wherein the display means comprises a plurality of lens pattern outlines corresponding to the shapes and sizes of the plurality of lens patterns.

18. The display and demonstration system of claim 16 wherein the means to mount and removably attach each of the lens patterns to the display means and to the eyeglass lenses comprises electrostatic attraction between the display means and the lens patterns and the lens patterns and the eyeglass lenses.

19. The display and demonstration system of claim 16 wherein the lens patterns and the display means are formed from electrostatic material.

* * * * *